United States Patent
Gustafson et al.

(10) Patent No.: US 6,560,980 B2
(45) Date of Patent: May 13, 2003

(54) METHOD AND APPARATUS FOR CONTROLLING EVAPORATOR AND CONDENSER FANS IN A REFRIGERATION SYSTEM

(75) Inventors: Alan Gustafson, Eden Prairie, MN (US); Dermott Crombie, Deephaven, MN (US); Mark Freese, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 63 days.

(21) Appl. No.: 09/832,240

(22) Filed: Apr. 10, 2001

(65) Prior Publication Data
US 2001/0054293 A1 Dec. 27, 2001

Related U.S. Application Data
(60) Provisional application No. 60/242,883, filed on Oct. 24, 2000, and provisional application No. 60/195,791, filed on Apr. 10, 2000.

(51) Int. Cl.[7] ............................................. F25D 17/06
(52) U.S. Cl. ............................ 62/186; 62/179; 62/209
(58) Field of Search ......................... 62/186, 179, 180, 62/181, 183, 184, 185, 208, 209, 203

(56) References Cited

U.S. PATENT DOCUMENTS

| | | | |
|---|---|---|---|
| 4,474,027 A | 10/1984 | Azmi et al. | |
| 4,748,822 A | 6/1988 | Erbs et al. | |
| 4,803,848 A | 2/1989 | LaBrecque | |
| 4,856,286 A | 8/1989 | Sulfstede et al. | |
| 5,046,326 A | 9/1991 | Havemann et al. | |
| 5,062,276 A | 11/1991 | Dudley | |
| 5,138,844 A | 8/1992 | Clanin et al. | |
| 5,144,812 A | 9/1992 | Mills, Jr. et al. | |
| 5,253,483 A | * 10/1993 | Powell et al. ............. | 62/186 X |
| 5,255,530 A | 10/1993 | Janke | |
| 5,533,352 A | 7/1996 | Bahel et al. | |
| 5,613,369 A | 3/1997 | Sato et al. | |
| 5,657,638 A | 8/1997 | Erdman et al. | |

* cited by examiner

*Primary Examiner*—Harry B. Tanner
(74) *Attorney, Agent, or Firm*—Michael Best & Friedrich LLP

(57) ABSTRACT

A method and apparatus for controlling evaporator and condenser fans in a refrigeration system. The apparatus is a refrigeration system including a refrigerant circuit defined by a compressor, a condenser, a throttling device, and an evaporator. The apparatus includes an evaporator fan and a condenser fan. The apparatus also includes a controller coupled to the fans. The controller includes a variable frequency drive unit. For the method of the invention, the speed of the fans is controlled by the controller.

18 Claims, 7 Drawing Sheets

Fig. 5

METHOD AND APPARATUS FOR CONTROLLING EVAPORATOR AND CONDENSER FANS IN A REFRIGERATION SYSTEM

RELATED APPLICATIONS

Priority is claimed under 35 U.S.C. §119 to U.S. patent application Ser. No. 60/242,883 filed Oct. 24, 2000 and U.S. patent application Ser. No. 60/195,791 filed Apr. 10, 2000.

BACKGROUND OF THE INVENTION

The invention relates in general to the operation of a refrigeration system, and more specifically to the control of the evaporator and condenser fans in a refrigeration system.

Refrigeration systems generally include a refrigerant circuit including a compressor, a condenser, a main throttling device, and an evaporator. Vapor refrigerant is delivered to the compressor where the temperature and pressure of the vapor refrigerant is increased. The compressed, vapor refrigerant is then delivered to the condenser where heat is removed from the vapor refrigerant in order to condense the vapor refrigerant into liquid refrigerant. Heat is removed from the vapor refrigerant by circulating air over the condenser.

Air is circulated over the condenser by a condenser fan. The condenser fan in refrigeration systems is commonly powered by cycling between a power source and a ground, i.e. by turning the fan on and off. When the condenser fan is cycled equally between on and off, the condenser fan consumes half as much power as when the condenser fan is always on.

From the condenser, the liquid refrigerant is delivered to a main throttling device The main throttling device restricts the flow of the liquid refrigerant by forcing the liquid through a small orifice in order to decrease the pressure of the liquid, causing the liquid to evaporate. Upon exiting the main throttling device, the liquid refrigerant is in the form of liquid refrigerant droplets.

From the main throttling device, the liquid refrigerant droplets are delivered to the evaporator. The evaporator is located within or in thermal communication with the space to be conditioned by the refrigeration system. As air circulates over the evaporator, the liquid refrigerant droplets continue to evaporate and absorb heat from the air in order to cool the air. The cooled air is circulated through the conditioned space to cool the masses within the conditioned space. As the liquid refrigerant droplets absorb heat, the liquid refrigerant droplets vaporize. To complete the refrigeration cycle, the vapor refrigerant is delivered from the evaporator back to the compressor.

Air is circulated over the evaporator and through the conditioned space by one or more evaporator fans. The evaporator fans in refrigeration systems are physically located in the air stream of the air being circulated through the conditioned space. Due to the physical location of the evaporator fans, the power supplied to the evaporator fans is ultimately added to conditioned space as unwanted heat. The unwanted heat added to the conditioned space by the evaporator fans must be compensated for by increasing the amount of cooling that the refrigeration system must do. Thus, evaporator fans require the refrigeration system to consume power to compensate for the unwanted heat, in addition to the power required to operate the evaporator fans. The net effect is that the electric power used to move air within the conditioned space is ultimately counted twice as non-cooling power.

In refrigeration systems with two-speed evaporator fans, the higher speed is typically used when the conditioned space is above freezing, while the lower speed is used when the conditioned space is below freezing. When keeping the conditioned space above freezing, it is more acceptable to add unwanted heat to the conditioned space. As a result, the evaporator fans can be operated at the higher speed, even though the evaporator fans emit more heat at the higher speed. When keeping the conditioned space below freezing, it is less acceptable to add unwanted heat to the conditioned space. As a result, the evaporator fans are operated at the lower speed in order to minimize the heat generated by the evaporator fans.

SUMMARY OF THE INVENTION

The use of two-speed condenser and evaporator fans in refrigeration systems has several limitations. Since the fans must be operated at one of two speeds, the fans cannot be operated at their most energy efficient speed. This results in more power being consumed by the fans and higher operating costs for the refrigeration system. Moreover, when the refrigeration system requires more power to operate, the refrigeration system consumes more non-renewable fossil fuel and the refrigeration system creates more air pollution. Specifically regarding the evaporator fans in refrigeration systems, since the fans must be operated at one of two speeds, more unwanted heat is often added to the conditioned space than is necessary. When more unwanted heat is added to the conditioned space, the time period for the refrigeration system to cool the conditioned space to within the desired temperature range is extended. Moreover, when the evaporator fans are operated at the higher speed, more air is circulated through the conditioned space which may result in the undesirable dehydration of the goods stored within the conditioned space.

The present invention provides a method and apparatus for controlling continuously-variable speed evaporator and condenser fans in a refrigeration system in order to minimize the power consumed by the evaporator and condenser fans, in order to minimize the unwanted heat added to the conditioned space by the evaporator fans, and in order to minimize the quantity of air circulated through the conditioned space by the evaporator fans to reduce the dehydration of the goods stored within the conditioned space.

In one embodiment of the invention, the apparatus is a refrigeration system including a refrigerant circuit defined by a compressor, a condenser, a throttling device, and an evaporator. The refrigeration system includes at least one evaporator fan and a controller coupled to the evaporator fan. The controller includes a variable frequency drive unit for providing variable frequency power to the evaporator fan. By virtue of this design, the speed of the evaporator fan can be precisely controlled so that the fan only operates at the desired speed, thus saving power, reducing unwanted heat, and reducing dehydration of the goods.

In another embodiment of the invention, the refrigeration system includes at least one condenser fan and a controller coupled to the condenser fan. The controller includes a variable frequency drive unit for providing variable frequency power to the condenser fan.

In one embodiment of the method of the invention, the speed of at least one evaporator fan is controlled in a refrigeration system including a compressor, a condenser, a throttling device, and an evaporator. The method includes providing a desired temperature for a conditioned space, measuring temperature at the inlet to the evaporator, and measuring temperature at the outlet to the evaporator. The method also includes calculating an actual temperature differential and adjusting an evaporator fan speed based on the desired temperature differential and the actual temperature differential.

In another embodiment of the method of the invention, the speed of at least one condenser fan is controlled. The method includes providing a condenser temperature threshold value and measuring an actual temperature of the condenser. The method also includes adjusting a condenser fan speed based on the condenser temperature threshold value and the actual temperature.

Other features and advantages of the invention will become apparent to those of ordinary skill in the art upon review of the following description, claims, and drawings.

Before one embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 1:
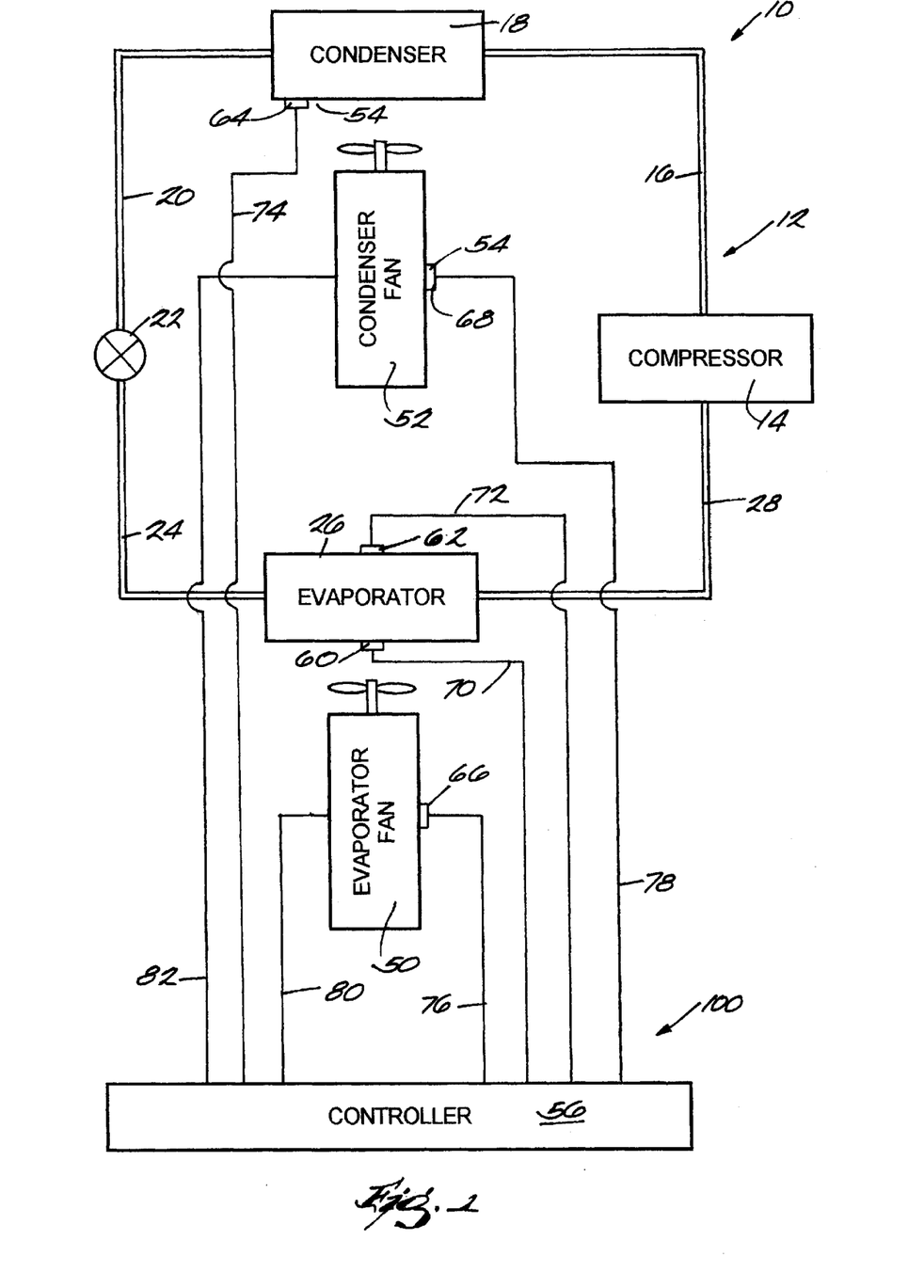
FIG. 1 is a schematic representation of a refrigeration system embodying the invention.

FIG. 1 illustrates a refrigeration system 10 embodying the invention. The refrigeration system 10 includes a refrigerant circuit 12, an evaporator fan 50, a condenser fan 52, and a controller circuit 100.

The refrigerant circuit 12 generally defines the flow of fluid refrigerant through the refrigeration system 10. The refrigerant circuit 12 includes a compressor 14, a discharge line 16, a condenser 18, a condenser output line 20, a throttling device 22, an evaporator input line 24, an evaporator 26, and a suction line 28.

The refrigerant in its various states flows through the refrigerant circuit 12 as described below. Vaporized refrigerant is delivered to the compressor 14 by the suction line 28. The compressor 14 compresses the vaporized refrigerant by increasing its temperature and pressure. The compressed, vaporized refrigerant is then delivered to the condenser 18 by the discharge line 16. The condenser 18 is a heat exchanger apparatus used to remove heat from the refrigerant in order to condense the vaporized refrigerant into liquid refrigerant. In the condenser 18, the compressed, vaporized refrigerant releases heat to the air in communication with the condenser 18 in order to cool the vaporized refrigerant. The cooling action of the condenser 18 causes the state of the refrigerant to change from vapor to liquid. Air is circulated into the condenser 18 by the condenser fan 52. In the preferred embodiment of the invention, the condenser fan 52 is a continuously-variable speed fan.

The liquid refrigerant is then delivered to the throttling device 22 by the condenser output line 20. The throttling device 22 restricts the flow of the liquid refrigerant by forcing the liquid refrigerant through a small orifice to decrease the pressure of the refrigerant in order to evaporate the liquid refrigerant. As the liquid refrigerant passes through the small orifice of the throttling device 22, the liquid refrigerant forms into liquid droplets.

The liquid refrigerant droplets are delivered to the evaporator 26 by the evaporator input line 24. The liquid refrigerant droplets delivered to the evaporator 26 absorb heat from warm air flowing into the evaporator 26. The evaporator 26 is located within or in thermal communication with the space being conditioned by the refrigeration system 10. Air is circulated between the conditioned space and the evaporator 26 by the evaporator fan 50. Generally, the evaporator fan 50 circulates warmer air into the evaporator 26, the liquid refrigerant droplets absorb heat from the warmer air, and the evaporator fan 50 circulates cooler air out of the evaporator 26. The cooler air circulated out of the evaporator 26 by the evaporator fan 50 cools the masses in the conditioned space by absorbing heat from the masses. Once the cooler air circulated through the conditioned space by the evaporator fan 50 absorbs heat from the masses within the conditioned space, the evaporator fan 50 circulates the warmer air back to the evaporator 26 to be cooled again.

As shown in FIG. 1, one evaporator fan 50 forces air into the evaporator 26 and the conditioned space. However, more than one evaporator fan 50 may be used. In the preferred embodiment of the invention, the evaporator fan 50 is physically located within the air stream of the air used to cool the conditioned space. Due to the physical location of the evaporator fan 50, the power supplied to the evaporator fan 50 is transferred to the conditioned space in the form of heat. In the preferred embodiment of the invention, the evaporator fan 50 is a continuously-variable speed fan.

The liquid refrigerant droplets vaporize once they have absorbed sufficient heat. The vaporized refrigerant is delivered by suction line 28 back to the compressor 14, completing the flow of refrigerant through the refrigerant circuit 12.

The refrigeration system 10 also includes a controller circuit 100. The controller circuit 100 includes a plurality of sensors 54 and a controller 56. In a preferred embodiment of the invention, the plurality of sensors 54 includes an evaporator input temperature ($T_{evap,in}$) sensor 60, an evaporator output temperature ($T_{evap,out}$) sensor 62, a condenser temperature ($T_{cond}$) sensor 64, an evaporator fan speed sensor 66, and a condenser fan speed sensor 68. In other embodiments of the invention, the plurality of sensors 54 may include a compressor discharge temperature sensor, a compressor discharge pressure sensor, a suction temperature sensor, or a suction pressure sensor. Each one of the plurality of sensors 54 is electrically coupled to the controller 56. Specifically, the evaporator input temperature ($T_{evap,in}$) sensor 60 is coupled to the controller 56 by an evaporator input temperature line 70. The evaporator output temperature ($T_{evap,out}$) sensor 62 is coupled to the controller 56 by an evaporator output temperature line 72. The condenser temperature ($T_{cond}$) sensor 64 is coupled to the controller 56 by a condenser temperature line 74. The evaporator fan speed sensor 66 is coupled to the controller 56 by an evaporator fan speed line 76. The condenser fan speed sensor 68 is coupled to the controller 56 by a condenser fan speed line 78. In addition, the controller 56 is electrically coupled to the evaporator fan 50 by an evaporator fan control line 80, and the controller 56 is electrically coupled to the condenser fan 52 by a condenser fan control line 82.

Figure 2:
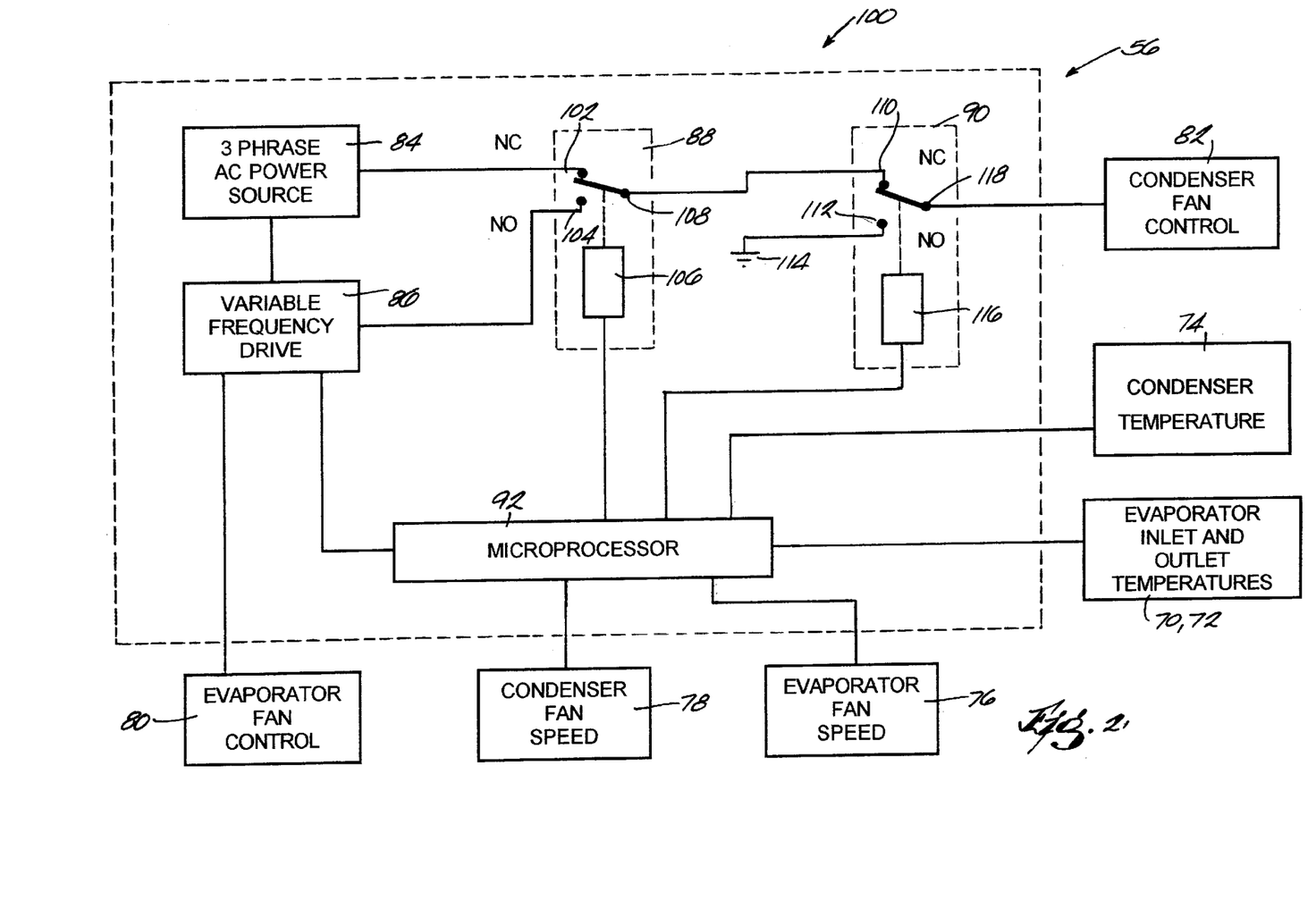
FIG. 2 is a schematic representation of the controller of the refrigeration system of FIG. 1.

FIG. 2 further illustrates the controller 56 of FIG. 1. In FIGS. 1 and 2, common elements have been given the same reference numerals. As illustrated in FIG. 2, the controller 56 includes a three-phase, alternating current (AC) power source 84, a variable frequency drive (VFD) unit 86, a first switch 88, a second switch 90, and a microprocessor 92.

Referring to FIGS. 1 and 2, in the preferred embodiment of the invention, one VFD unit 86 provides power to both the evaporator fan 50 and the condenser fan 52. However, two separate VFD units (not shown) may provide power to each one of the evaporator fan 50 and the condenser fan 52. The VFD unit 86 is a device used to convert conventional, three-phase, AC power at a voltage of 350 to 500 Volts and a frequency of 50 to 60 Hertz into power with a desired voltage and a desired frequency. VFD devices are conventionally known, and generally consist of a full wave rectifier circuit, a filter circuit, and a transistor circuit. The full wave rectifier circuit converts the three-phase, AC power into DC power. The filter circuit generally includes large electrolytic capacitors that filter the DC power. The transistor circuit generally includes an insulated-gate bipolar transistor (IGBT) which converts the DC power into AC power with a desired voltage and a desired frequency. The VFD unit 86 is coupled to the microprocessor 92, which controls the power output of the VFD unit 86. As the frequency of the power output of the VFD unit 86 is reduced, the AC voltage of the power output of the VFD unit 86 is also reduced. The AC voltage of the power output is reduced in order to compensate for the decrease in the inductive reactance (AC resistance) that results as the applied frequency of the fan motor decreases.

In the preferred embodiment of the invention, the VFD unit 86 is physically located inside the conditioned space and the microprocessor 92 is physically located in a control box (not shown) outside the conditioned space. In operation, the VFD unit 86 emits heat and requires a heat sink. If the VFD unit 86 is positioned within the conditioned space, a smaller, less complex heat sink can be used due to the colder temperatures in the conditioned space. For example, if the VFD unit 86 is positioned within the conditioned space, a flat piece of aluminum can be used for the heat sink. Due to the colder temperatures in the conditioned space, positioning the VFD unit 86 in the conditioned space also improves the current handling abilities of the VFD unit 86.

Referring to FIGS. 1 and 2, in order to provide power to the evaporator fan 50, the AC power source 84 is electrically coupled to the VFD unit 86. The VFD unit 86 is electrically coupled to the evaporator fan 50 by the evaporator fan control line 80. The VFD unit 86 is also electrically coupled to the microprocessor 92. The microprocessor 92 provides a control signal to the VFD unit 86, and the VFD unit 86 provides variable frequency power to the evaporator fan 50 via evaporator fan control line 80.

In order to provide power to the condenser fan 52, the AC power source 84 is electrically coupled to a first input 102 of the first switch 88. The VFD unit 86 is electrically coupled to a second input 104 of the first switch 88. The first switch 88 is a relay-type device designed for high current applications. The first switch 88 includes a first contactor 106 including a normally closed (NC) position and a normally open (NO) position. The NC position for the first switch 88 corresponds to the first input 102, while the NO position corresponds to the second input 104. An output 108 of the first switch 88 is electrically coupled to a first input 110 of the second switch 90. A second input 112 of the second switch 90 is coupled to a ground 114. The second switch 90 is also a relay-type device designed for high current applications. The second switch 90 includes a second contactor 116 including a NC position and a NO position. The NC position for the second switch 90 corresponds to the first input 110, while the NO position corresponds to the second input 112. An output 118 of the second switch 90 is electrically coupled to the condenser fan 52 by the condenser fan control line 82. In addition, the first contactor 106 of the first switch 88 and the second contactor 116 of the second switch 90 are each electrically coupled to the microprocessor 92. The microprocessor 92 provides control signals to the first switch 88 and the second switch 90 in order to provide power to the condenser fan 52 via the condenser fan control line 82.

Figure 5:
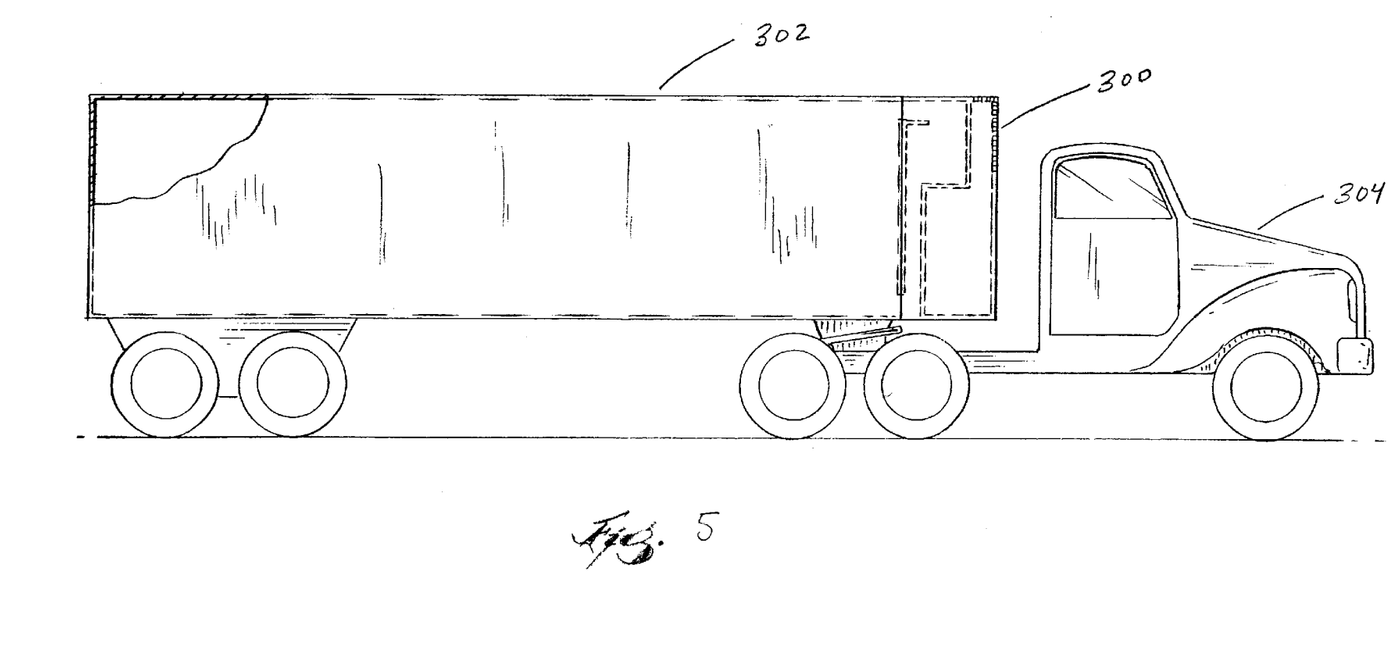
FIG. 5 illustrates the refrigeration system of FIG. 1 located within a container transport refrigeration unit coupled to a cargo container coupled to a tractor-trailer.

In the preferred embodiment of the invention, as illustrated in FIG. 5, the above-described refrigeration system 10 is located within a container transport refrigeration unit 300 mounted on a cargo container 302. The cargo container 302 is coupled to a tractor-trailer 304. Alternatively, the container transport refrigeration unit 300 may be coupled to any type of cargo container coupled to any type of vehicle suitable for the transportation of goods, e.g. a flat-bed tractor-trailer, a sea-going vessel, or a flat-bed rail car.

Figure 3A:
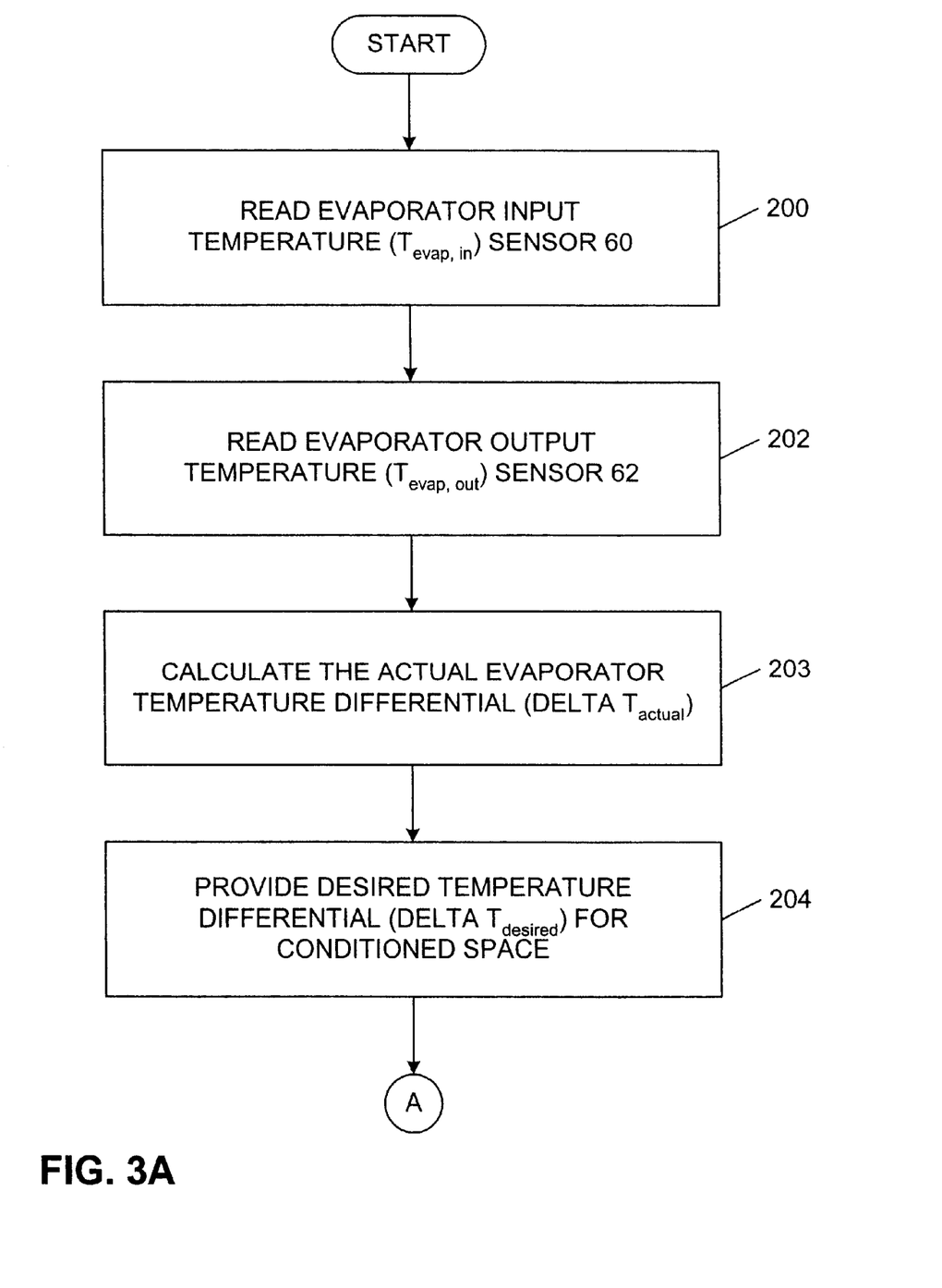
FIGS. 3A and 3B illustrate a method of controlling the evaporator fan of the refrigeration system of FIG. 1.
Figure 3B:
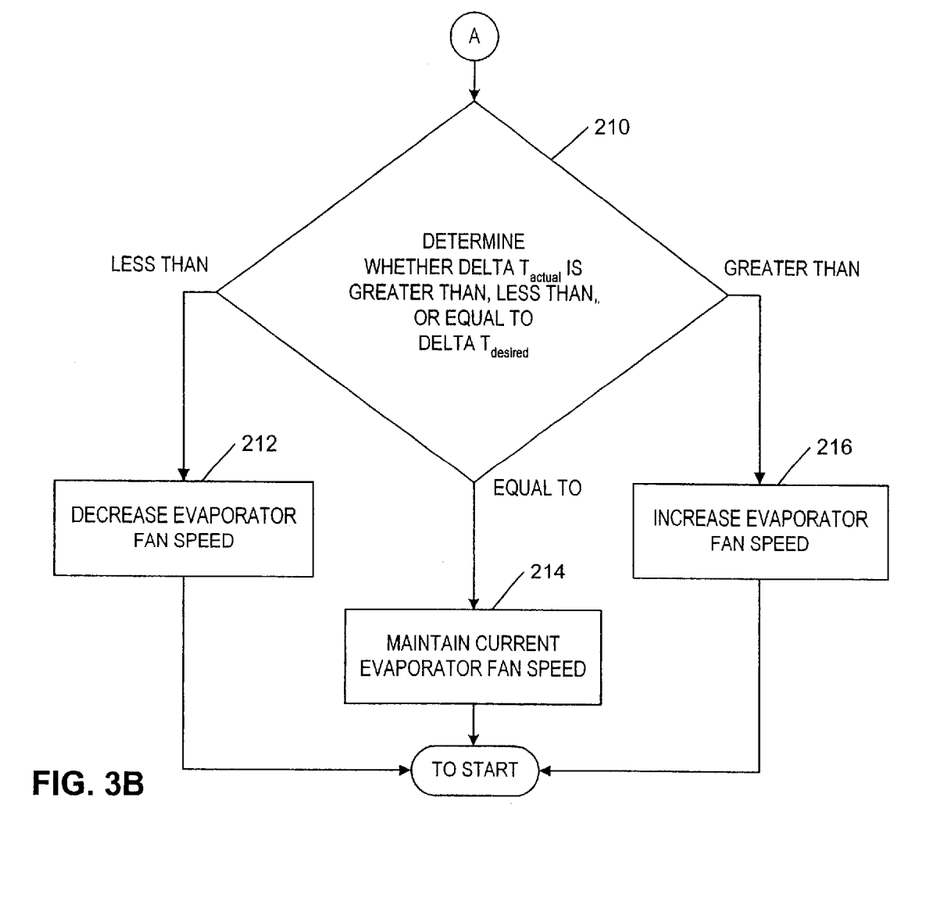

FIGS. 3A and 3B illustrate a method of operating the evaporator fan 50 of the refrigeration system 10 embodying the invention. Referring to FIGS. 1, 2, and 3A, the microprocessor 92 reads 200 the evaporator input temperature ($T_{evap,in}$) sensor 60 via the evaporator input temperature line 70. The microprocessor 92 reads 202 the evaporator output temperature ($T_{evap,out}$) sensor 62 via the evaporator output temperature line 72. $T_{evap,in}$ and $T_{evap,out}$ vary depending on the ambient temperature of the air outside the conditioned space. For example, if the temperature is higher outside the conditioned space than inside the conditioned space, $T_{evap,in}$ will be higher than $T_{evap,out}$. Similarly, if the temperature is lower outside the conditioned space than inside the conditioned space, $T_{evap,in}$ will be lower than $T_{evap,out}$. The microprocessor 92 then calculates 203 the actual evaporator temperature differential ($\Delta T_{actual}$) by calculating the difference between $T_{evap,in}$ and $T_{evap,out}$.

An operator of the refrigeration system 10 may provide 204 a desired temperature differential ($\Delta T_{desired}$) for the conditioned space, which is also referred to as the delta of the conditioned space. The $\Delta T_{desired}$ range may then be stored in a memory location accessible by the microprocessor 92. The operator of the refrigeration system 10 may select the $\Delta T_{desired}$ range based on the type of goods being stored within the conditioned space. For example, the operator of the refrigeration system 10 may want the temperature of the conditioned space to stay within a $\Delta T_{desired}$ range of 33° F. to 35° F. For the transportation of produce in refrigerated cargo containers, the operator of the refrigeration system 10 may vary the $\Delta T_{desired}$ range depending on the type of produce being transported. Specifically, the operator of the refrigeration system 10 can set the $\Delta T_{desired}$ range to the maximum temperature differential the produce can tolerate in order to arrive at its destination in acceptable condition. For example, spinach can only tolerate a temperature differential of 1° F., while potatoes can tolerate a temperature differential of 15° F.

Referring to FIGS. 1, 2, and 3B, the microprocessor 92 determines 210 whether $\Delta T_{actual}$ is greater than, less than, or equal to $\Delta T_{desired}$. If $\Delta T_{actual}$ is less than $\Delta T_{desired}$, the microprocessor 92 sends a signal to the evaporator fan 50 via the evaporator fan control line 80 to decrease 212 the speed of the evaporator fan 50. Once the microprocessor 92 sends the signal to decrease 212 the speed of the evaporator fan 50, the microprocessor 92 begins the sequence again by performing act 200.

If $\Delta T_{actual}$ is approximately equal to $\Delta T_{desired}$, the microprocessor 92 sends a signal to the evaporator fan 50 via the evaporator fan control line 80 to maintain 214 the speed of the evaporator fan 50. Once the microprocessor 92 sends the signal to maintain 214 the speed of the evaporator fan 50, the microprocessor 92 begins the sequence again by performing act 200.

When $\Delta T_{actual}$ is approximately equal to $\Delta T_{desired}$, the VFD unit 86 may also vary the frequency and voltage of the power provided to the evaporator fan 50. Varying the frequency and voltage of the power provided to the evaporator fan 50 when $\Delta T_{actual}$ is approximately equal to $\Delta T_{desired}$ has several benefits. First, the power required to operate the evaporator fan 50 is greatly reduced. The power consumed by the evaporator fan 50 is a cubic function of the fan speed. As a result, when the evaporator fan 50 is operated at half speed, the evaporator fan 50 consumes one-eighth as much power as when the evaporator fan 50 is operated at full speed. Second, the heat added to the conditioned space by the evaporator fan 50 is minimized, which reduces the amount of power necessary to maintain the conditioned space within the $\Delta T_{desired}$ range. Third, varying the frequency and the voltage of the power provided to the evaporator fan 50 minimizes the air flow through the conditioned space. When the air flow through the conditioned space is minimized, less moisture is carried away from the goods. When less moisture is carried away from the goods, less dehydration of the goods results. For the transportation of produce in refrigerated container units, produce that is less dehydrated has a better appearance, a higher product-weight, and a longer shelf-life.

Finally, if $\Delta T_{actual}$ is greater than $\Delta T_{desired}$, the microprocessor 92 sends a signal to the evaporator fan 50 via the evaporator fan control line 80 to increase 216 the speed of the evaporator fan 50. Once the microprocessor 92 sends the signal to increase 216 the speed of the evaporator fan 50, the microprocessor 92 begins the sequence again by performing act 200. This period of operation during which the temperature of the conditioned space must be reduced is referred to as pulldown. The evaporator fan 50 is generally operated at full speed during pulldown in order to remove heat from the conditioned space as rapidly as possible. In order to operate the evaporator fan 50 at full speed, the VFD unit 86 generally provides three-phase, AC power to the evaporator fan 50 from the AC power source 84.

Figure 4A:
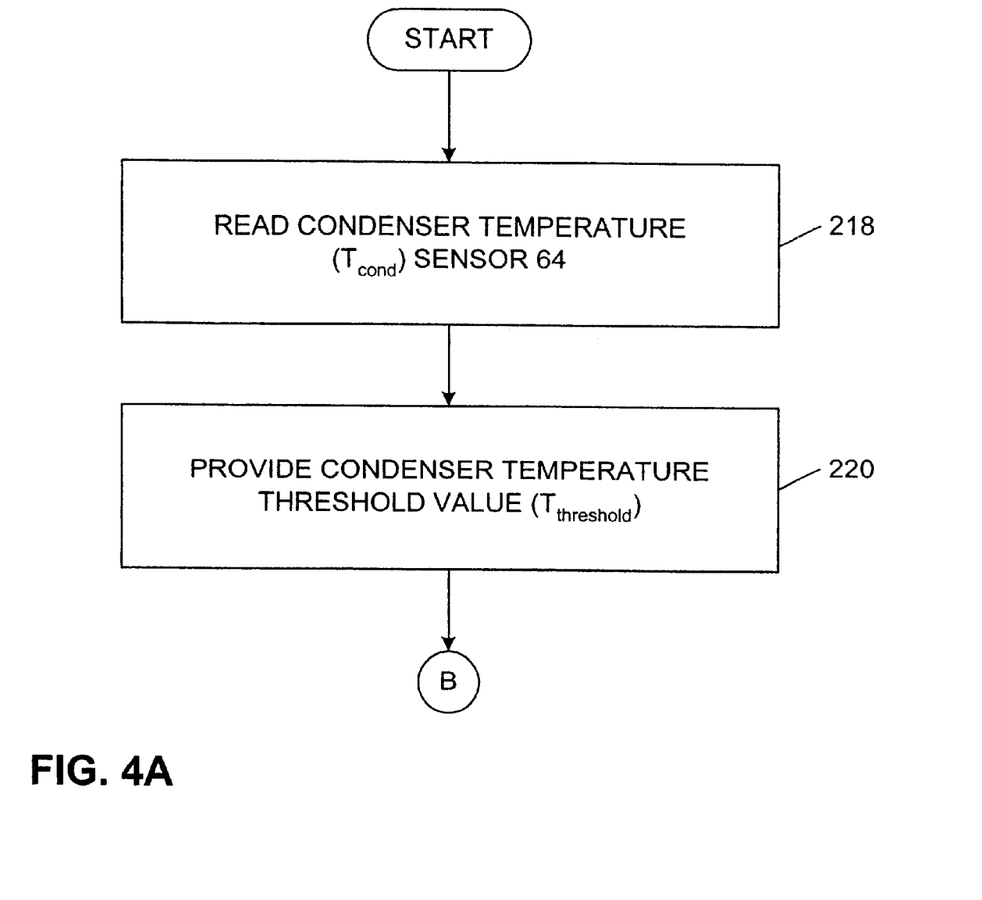
FIGS. 4A and 4B illustrate a method of controlling the condenser fan of the refrigeration system of FIG. 1.
Figure 4B:
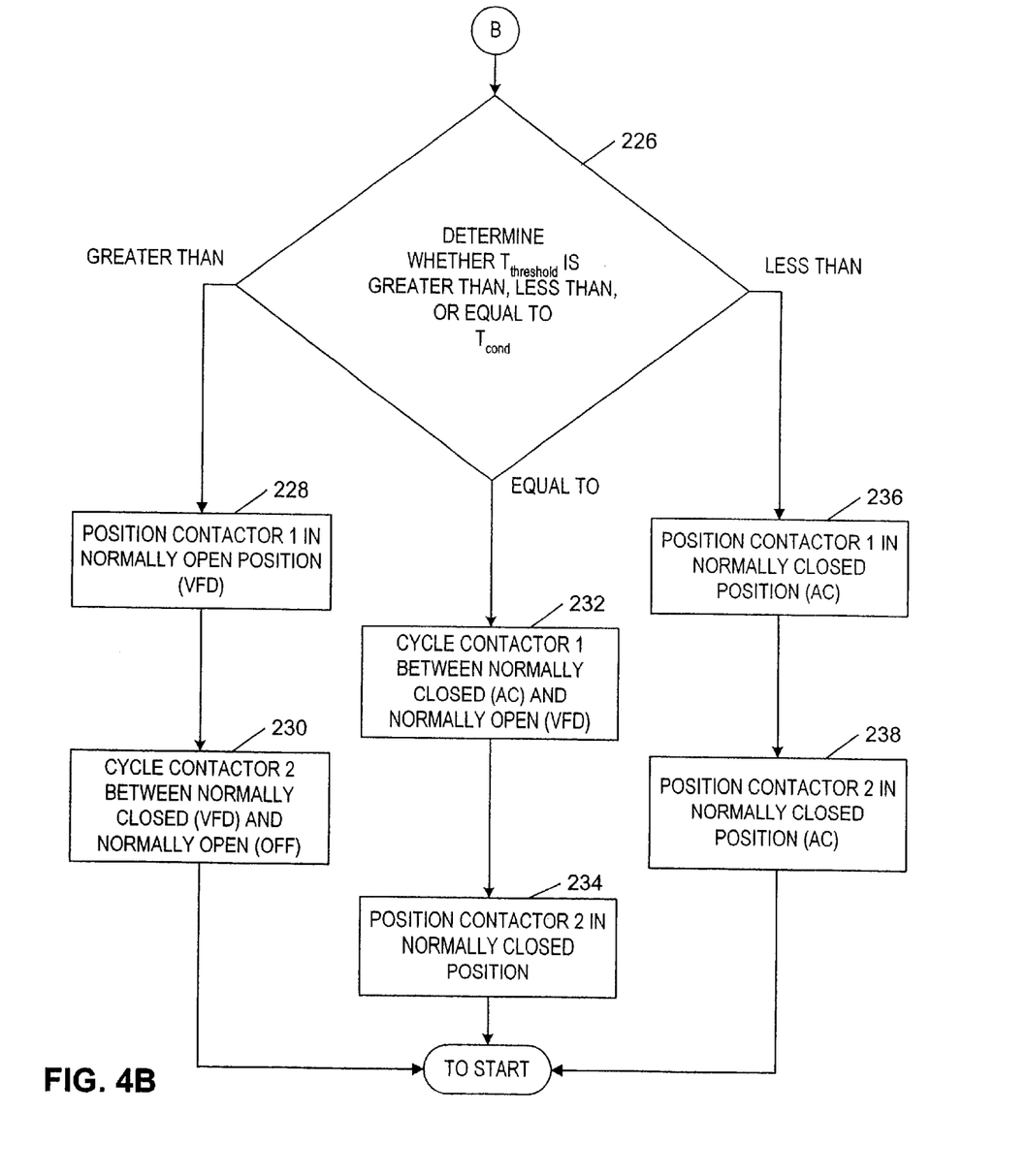

FIGS. 4A and 4B illustrate a method of operating the condenser fan 52 of the refrigeration system 10 embodying the invention. Referring to FIGS. 1, 2, and 4A, the microprocessor 92 reads 218 the condenser temperature ($T_{cond}$) sensor 64. In the preferred embodiment of the invention, the condenser temperature ($T_{cond}$) sensor 64 is physically located within the fins of the condenser 18. By being located within the fins of the condenser 18, the sensor 64 measures the temperature of the metal exterior of the condenser 18. The temperature of the metal exterior of the condenser 18 correlates closely to the temperature of the refrigerant within the condenser 18.

A condenser temperature threshold value ($T_{threshold}$) is provided 220 to the microprocessor 92. The $T_{threshold}$ value is based on the specific condenser unit and the specific type of refrigerant being used in the refrigeration system 10. The $T_{threshold}$ value corresponds to the temperature necessary to keep the pressure of the specific type of refrigerant in the condenser 18 high enough so that the valves within the compressor 14 remain closed and sealed. Moreover, a minimum pressure in the condenser 18 must be maintained for the proper operation of the throttling device 22. Alternatively, the $T_{threshold}$ value may be a temperature range ($\Delta T_{threshold}$). The $T_{threshold}$ value may be stored in a memory location accessible by the microprocessor 92.

Referring to FIGS. 1, 2, and 4B, the microprocessor 92 determines 226 whether $T_{threshold}$ is greater than, less than, or equal to $T_{cond}$. If $T_{threshold}$ is greater than $T_{cond}$, the condenser fan speed must be decreased. To decrease the condenser fan speed, the microprocessor 92 sends 228 a first signal to the first switch 88 in order to position the first contactor 106 in the NO position corresponding to the second input 104 of the first switch 88. The positioning of the first contactor 106 in the NO position results in variable frequency power being provided to the output 108 of the first switch 88. The microprocessor 92 then sends 230 a second signal to the second switch 90 in order to cycle the second contactor 116 between the NC position corresponding to the first input 110 and the NO position corresponding to the second input 112. The cycling of the second contactor 116 between the NC position and the NO position results in variable frequency power cycled with no power being provided to the output 118 of the second switch 90. Variable frequency power cycled with no power is then provided to the condenser fan 52 via the condenser fan control line 82, in order to decrease the speed of the condenser fan 52.

If $T_{threshold}$ is approximately equal to $T_{cond}$, the current condenser fan speed is maintained. In order to maintain the current condenser fan speed, the microprocessor 92 sends 232 a first signal to the first switch 88 in order to cycle the first contactor 106 between the NC position corresponding to the first input 102 and the NO position corresponding to the second input 104. The cycling of the first contactor 106 between the NC position and the NO position results in three-phase, AC power cycled with variable frequency power being provided to the output 108 of the first switch 88. The microprocessor 92 then sends 234 a second signal to the second switch 90 in order to position the second contactor 116 in the NC position corresponding to the first input 110 of the second switch 90. The positioning of the second contactor 116 in the NC position results in three-phase, AC power cycled with variable frequency power being provided to the output 118 of the second switch 90. Three-phase, AC power cycled with variable frequency power is then provided to the condenser fan 52 via the condenser fan control line 82, in order to generally maintain the current speed of the condenser fan 52.

If $T_{threshold}$ is less than $T_{cond}$, the condenser fan speed must be increased. In order to increase the condenser fan speed, the microprocessor 92 sends 236 a first signal to the first switch 88 in order to position the first contactor 106 in the NC position corresponding to the first input 102. The positioning of the first contactor 106 in the NC position results in three-phase, AC power being provided to the output 108 of the first switch 88. The microprocessor 92 then sends 238 a second signal to the second switch 90 in order to position the second contactor 116 in the NC position corresponding to the first input 110. The positioning of the second contactor 116 in the NC position results in three-phase, AC power being provided to the output 118 of the second switch 90. Three-phase, AC power is then provided to the condenser fan 52 via the condenser fan control line 82, in order to increase the speed of the condenser fan 52.

The power consumed by the condenser fan 52 is greatly reduced when the condenser fan 52 is operated below full speed, because the power consumed by the condenser fan 52 is a cubic function of the fan speed. As a result, when the condenser fan 52 is operated at half speed, the condenser fan 52 consumes one-eighth as much power as when the condenser fan 52 is operated at full speed.

Various features and advantages of the invention are set forth in the following claims.

What is claimed:

1. A refrigeration system comprising:
   a refrigerant circuit defined by a compressor, a condenser, a throttling device, and an evaporator;
   at least one evaporator fan;
   a first sensor positioned adjacent to the evaporator inlet for sensing the temperature of air flowing into the evaporator;
   a second sensor positioned adjacent to the evaporator outlet for sensing the temperature of air flowing out of the evaporator; and
   a controller coupled to the at least one evaporator fan and communicating with the first sensor and the second sensor, the controller including a variable frequency drive unit for providing variable frequency power to the at least one evaporator fan, the controller adjusting power provided to the at least one evaporator fan based on the sensed temperatures.

2. The refrigeration system of claim 1 wherein the at least one evaporator fan is a continuously-variable speed fan.

3. The refrigeration system of claim 1 and further comprising at least one condenser fan and a third sensor coupled to the condenser for sensing a temperature of the condenser, and wherein the controller adjusts a condenser fan speed based on the sensed temperature of the condenser.

4. A refrigeration system comprising:
   a refrigerant circuit defined by a compressor, a condenser, a throttling device, and an evaporator;
   at least one evaporator fan;
   a controller coupled to the at least one evaporator fan, the controller including a variable frequency drive unit for providing variable frequency power to the at least one evaporator fan; and
   at least one sensor coupled to the refrigerant circuit for sensing a system parameter, wherein the at least one sensor includes a first sensor for sensing the temperature of air flowing into the evaporator and a second sensor for sensing the temperature of air flowing out of the evaporator, and wherein the controller adjusts an evaporator fan speed based on the sensed temperatures.

5. The refrigeration system of claim 4 wherein the controller includes an alternating current power source coupled to the variable frequency drive unit.

6. The refrigeration system of claim 5 wherein the controller includes a microprocessor coupled to the at least one sensor and the variable frequency drive unit.

7. The refrigeration system of claim 6 and further comprising at least one condenser fan.

8. The refrigeration system of claim 7 wherein the condenser fan is a continuously-variable speed fan.

9. The refrigeration system of claim 7 wherein the at least one sensor includes a third sensor coupled to the condenser for sensing the temperature of the condenser, and wherein the controller adjusts a condenser fan speed based on the sensed temperature.

10. The refrigeration system of claim 7 wherein the controller includes a first switch, a first input to the first switch coupled to the alternating current power source, a second input to the first switch coupled to the variable frequency drive unit, and an output from the first switch coupled to a first input of a second switch, a second input to the second switch coupled to a ground, and an output from the second switch coupled to the at least one condenser fan.

11. The refrigeration system of claim 10 wherein the first switch and the second switch are coupled to the microprocessor.

12. The refrigeration system of claim 11 wherein the microprocessor controls the first switch and the second switch in order to provide power to the at least one condenser fan in the form of a one of alternating current power, alternating current power cycled with variable frequency drive power, and variable frequency drive power cycled with no power.

13. A method of controlling the speed of at least one evaporator fan in a refrigeration system, the refrigeration system including a compressor, a condenser, a throttling device, and an evaporator, the method comprising:
   providing a desired temperature differential for a conditioned space;
   measuring temperature at the inlet to the evaporator;
   measuring temperature at the outlet to the evaporator;
   calculating an actual temperature differential; and
   adjusting an evaporator fan speed based on the desired temperature differential and the actual temperature differential.

14. The method of claim 13 wherein adjusting an evaporator fan speed includes adjusting the frequency of the power delivered to the at least one evaporator fan.

15. The method of claim 13 and further comprising determining whether the actual temperature differential is greater than, less than, or equal to the desired temperature differential.

16. The method of claim 15 wherein adjusting an evaporator fan speed includes increasing the evaporator fan speed if the actual temperature differential is greater than the desired temperature differential.

17. The method of claim 15 wherein adjusting an evaporator fan speed includes maintaining the evaporator fan speed if the actual temperature differential is equal to the desired temperature differential.

18. The method of claim 15 wherein adjusting an evaporator fan speed includes decreasing the evaporator fan speed if the actual temperature differential is less than the desired temperature differential.

* * * * *